United States Patent [19]

Kogure

[11] Patent Number: 5,394,918
[45] Date of Patent: Mar. 7, 1995

[54] PNEUMATIC RADIAL TIRE WITH REDUCED ROAD NOISE

[75] Inventor: Tomohiko Kogure, Hiratsuka, Japan

[73] Assignee: The Yokohama Rubber Co., Ltd., Tokyo, Japan

[21] Appl. No.: 73,488

[22] Filed: Jun. 9, 1993

[30] Foreign Application Priority Data

Jul. 8, 1992 [JP] Japan ................. 4-180663

[51] Int. Cl.⁶ ............... B60C 9/18; B60C 13/02
[52] U.S. Cl. .................... 152/523; 152/526; 152/531; 152/538; 152/555
[58] Field of Search ............. 152/555, 526, 538, 531, 152/533, 523; D12/152

[56] References Cited

U.S. PATENT DOCUMENTS

| | | | |
|---|---|---|---|
| 3,253,635 | 5/1966 | Travers | 152/523 |
| 3,554,261 | 1/1971 | Mirtain et al. | 152/538 X |
| 3,961,657 | 6/1976 | Chrobak | 152/555 X |

FOREIGN PATENT DOCUMENTS

| | | | |
|---|---|---|---|
| 2823774 | 12/1979 | Germany | 152/555 |
| 58-112806 | 7/1983 | Japan | 152/523 |
| 63-166605 | 7/1988 | Japan | 152/526 |
| 1-314611 | 12/1989 | Japan | 152/555 |
| 3-253406 | 11/1991 | Japan | 152/555 |
| 3-273907 | 12/1991 | Japan | 152/523 |
| 4-5112 | 1/1992 | Japan | 152/523 |

*Primary Examiner*—Adrienne Johnstone
*Attorney, Agent, or Firm*—Nikaido, Marmelstein, Murray & Oram

[57] ABSTRACT

In a pneumatic tire of the type wherein both end portions of a carcass layer are supported by a pair of right and left bead cores, respectively, and at least two belt layers are disposed on the outer periphery of a tread of the carcass layer, a cord reinforcing layer having a cord weight per unit width of not greater than 1.30 g/mm on a radial section and a cord angle of not greater than 80° with respect to a tire circumferential direction is disposed at a buttress portion between a maximum width portion of a tire section and the end portion of the belt layers in a tire width-wise direction.

5 Claims, 2 Drawing Sheets

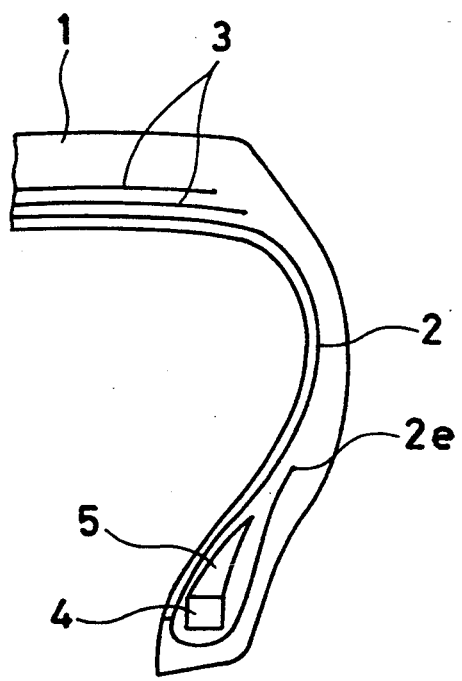
FIG. 3
CONVENTIONAL

PNEUMATIC RADIAL TIRE WITH REDUCED ROAD NOISE

BACKGROUND OF THE INVENTION

This invention relates to a pneumatic radial tire which reduces a road noise having a vibration peak in a high frequency range of higher than 250 Hz.

As automobiles have been graded up in recent years, reduction of a road noise generated by the transmission of vibration of tires during driving into the car cabin has become a serious problem.

The road noise varies with a frequency, and includes a road noise having a vibration peak in a relatively low frequency range of about 100 to about 200 Hz (hereinafter referred to as the "low frequency range road noise") and a road noise having a vibration peak in a high frequency range of about 250 to about 400 Hz (hereinafter referred to as the "high frequency range road noise"). This former, that is, the low frequency range road noise, can be reduced relatively easily by increasing a rubber weight at a tread or reducing a spring constant of the tread so as to reduce an intrinsic vibration of a sidewall, and making different this intrinsic vibration from acoustic characteristics inside a car cabin.

As means for reducing the latter, that is, the high frequency range road noise, Japanese Patent Laid-Open No. 253406/1991 increases a rigidity by disposing locally a reinforcing member on an upper portion of sidewalls. However, the mere disposition of the reinforcing layer on the upper portion of sidewalls cannot reduce reliably and effectively the high frequency range road noise as will be obvious from the following description of the present invention.

SUMMARY OF THE INVENTION

It is an object of the present invention to provide a pneumatic radial tire which can reliably reduce the high frequency range road noise.

In a pneumatic radial tire of the type wherein both end portions of a carcass layer are turned up around a pair of right and left bead cores and at least two belt layers are disposed on the outer periphery of the tread of this carcass layer, the object of the present invention described above can be accomplished by disposing a cord reinforcing layer at the buttress between the greatest width portion of the radial section of the tire and the end portion of the belt layers in the direction of the tire width, and setting the cord weight of the cord reinforcing layer per unit width on the radial section to be not greater than 1.30 g/mm and the cord angle in the tire circumferential direction to be not greater than 80°.

When the cord reinforcing layer is disposed at the buttress as described above, the cord angle with respect to the tire circumferential direction is set to be up to 80° so that the rigidity (spring constant) in the tire circumferential direction can be increased. Further, since the cord weight per unit width is set to a low mass of not greater than 1.30 g/mm, the buttress effectively shifts the intrinsic vibration frequency in the high frequency range as the loop of the vibration to a higher side and prevents resonance with the intrinsic vibration of the vehicle. Accordingly, the road noise in the high frequency range can be reduced reliably.

BRIEF DESCRIPTION OF THE DRAWINGS

FIG. 3 is a schematic semi-sectional view of a conventional pneumatic radial tire.

DETAILED DESCRIPTION OF THE PREFERRED EMBODIMENTS

Figure 1:
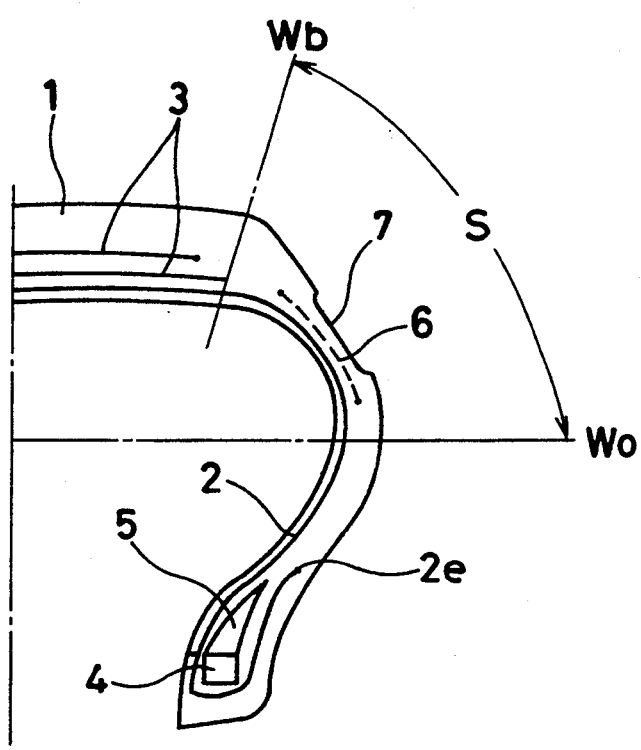
FIGS. 1 is a schematic semi-sectional view of a pneumatic radial tire according to an embodiment of the present invention.

Referring to FIG. 1, reference numeral 1 denotes a tread, reference numeral 2 denotes a carcass layer, and reference numeral 3 denotes a belt layer. The carcass layer 2 is substantially disposed at a cord angle of 90° relative to a tire circumferential direction, and both end portions of the carcass layer 2 are turned up from inside to outside of the tire around a pair of right and left bead cores 4. Each turnup end 2e is turned up outside and above a bead filler 5. Two belt layers 3 crossing each other at a cord angle of 5° to 40° with respect to the tire circumferential direction are disposed outside the carcass layer 2 at the tread portion 1 around the periphery of the tire. A cord reinforcing layer 6 is so disposed as to extend along the carcass layer 2 in a region S (buttress portion) between a tire maximum width position Wo and the end portion Wb of the belt layer 3 in the tire width-wise direction. A recess portion 7 is so formed on the surface of this buttress portion S as to extend around the periphery of the tire.

In the present invention, the cord reinforcing layer 6 is disposed so that the cord angle thereof with respect to the tire circumferential direction is not greater than 80°, preferably not greater than 60° and particularly preferably at a substantial zero angle. The rigidity of the buttress portion S in the tire circumferential direction can be increased by disposing the cord reinforcing layer 6 at such a cord angle. Furthermore, the cord reinforcing layer 6 is of a light-weight type so that the cord weight per unit width on the radial section is not greater than 1.30 g/min. The smaller this cord weight, the better but if the cord weight is excessively small, the effect of increasing the rigidity by the cord reinforcing layer cannot be obtained. Accordingly, the lower limit of the cord weight is preferably 0.10 g/min. Such a cord reinforcing layer can increase the rigidity (spring constant) of the buttress portion S in the tire circumferential direction. At the same time, since the cord weight of the cord reinforcing layer 6 per unit width is reduced to be down to 1.30 g/mm, the buttress portion S can shift the intrinsic vibration frequency as the loop of the vibration to a higher side. Accordingly, the intrinsic vibration of the tire in the range of about 250 to about 400 Hz does not undergo resonance with the intrinsic vibration of the vehicle, and the vibration is not transmitted into the car cabin. Consequently, the road noise in the high frequency range can be reduced reliably.

If the recess 7 is formed on the surface of the buttress portion S, the weight of this portion can be reduced. Accordingly, the intrinsic vibration of the buttress portion S can be shifted to a higher side and consequently, the road noise reducing effect in the high frequency range can be further improved.

Figure 2:
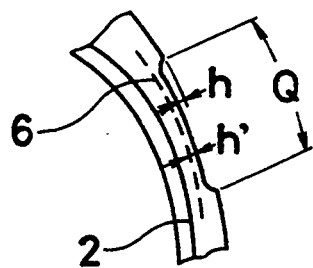
FIG. 2 is a partial enlarged sectional view of FIG. 1.

The size of the recess is preferably such that its depth h is at least 15% of the thickness (h+h') of the rubber layer of the buttress portion over the cord reinforcing layer away from the recess and its width Q is at least 30% of the width of the cord reinforcing layer, as shown in FIG. 2. However, the minimum rubber thickness h' of the rubber layer of the buttress portion over the cord reinforcing layer must be at least 1 mm.

In the present invention, reinforcing cords that constitute the cord reinforcing layer are not limited, in particular, so long as the cord weight per unit width, described above, is satisfied. For example, organic fiber cords such as nylon, polyesters, and aramid, steel cords and glass fiber cords can be used. Preferably, organic fiber cords having a small specific gravity are used.

As described above, the present invention disposes the cord reinforcing layer at the buttress portion so that the cord angle relative to the tire circumferential direction is not greater than 80° so as to increase the rigidity (spring constant) in the tire circumferential direction, and reduces the cord weight of the cord reinforcing layer per unit width to a value not greater than 1.30 g/mm so as to effectively shift the intrinsic vibration frequency in the high frequency range resulting from the vibration of the buttress portion to a higher side and thus to prevent resonance with the intrinsic vibration of the vehicle. Accordingly, the present invention can reliably reduce the road noise in the high frequency range.

EXAMPLE 1

Tire Nos. 1 to 5 of the present invention and a Comparative Tire 1 were produced. These tires had the same tire size and the same properties of the cord reinforcing layer as listed below and were in common with one another in that the center of the cord reinforcing layer in the widthwise direction was coincident with the center of the buttress portion S in the tire radial direction as shown in FIG. 1. However, only the cord angles of the cord reinforcing layer of these tires with respect to the tire circumferential direction were changed as tabulated in Table 1.

| | |
|---|---|
| Tire size: 175/70R13 | |
| Various properties of cord reinforcing layer: | |
| kind of cord: | nylon cord of 840D/2 |
| thickness: | 1.0 mm |
| end count: | 50 pcs/50 mm (cord weight per unit width = 0.23 g/mm) |
| width: | 30 mm |

The peak level of the road noise of each of these six kinds of radial tires was measured in accordance with the following measurement method, and the results were tabulated in Table 1.

Measurement Method of Road Noise

After an air pressure of 200 kPa (2.0 kgf/cm$^2$) was charged to each tire, the tire was mounted to a rim of 13×5 J and was mounted to a vehicle of a front engine/front wheel drive type (FF). A sound pressure level (dB) of the road noise at the position of an ear on the window side of the driver's seat inside the car cabin was measured when the vehicle was driven on a rough road surface at a speed of 50 km/h. After a frequency analysis was conducted in a ⅓ octave band, the maximum value in the range of 250 to 400 Hz was adopted as the peak level.

TABLE 1

| | Cord angle of reinforcing layer (°) | Peak level of road noise (dB) |
|---|---|---|
| Comparative Tire 1 | 90 | 60.1 |
| Tire of Invention 1 | 80 | 59.8 |
| Tire of Invention 2 | 60 | 59.7 |
| Tire of Invention 3 | 40 | 59.7 |
| Tire of Invention 4 | 20 | 59.6 |
| Tire of Invention 5 | 0 | 59.4 |

It can be understood from Table 1 given above that the smaller the cord angle of the cord reinforcing layer with respect to the tire circumferential direction, the lower became the road noise in the high frequency range.

EXAMPLE 2

The tire Nos. 6 to 11 of the present invention and Comparative Tires Nos. 2 to 4 were produced. All of these tires had the same tire size and the same properties of the cord reinforcing layer as the tires of Example 1 and were in common with one another in that the cord angle of the cord reinforcing layer was kept constant at 55° with respect to the tire circumferential direction, but the kind of the reinforcing cords of the cord reinforcing layer, the cord weight (on one side) of the cord reinforcing layer, the end count per 50 mm width and the cord weight (g/mm) per unit width were changed as tabulated in Table 2, respectively.

For comparison, a Conventional Tire having the same tire size but not equipped with the cord reinforcing layer, as shown in FIG. 3, was also produced.

The peak level of the road noise was measured for each of these ten kinds of tires under the same measurement condition as that of Example 1, and the road noise improving effect (by feeling) was evaluated using the Conventional tire as the reference. The result was tabulated in Table 2.

TABLE 2

| | Cord reinforcing layer | | | | | |
|---|---|---|---|---|---|---|
| | Kind of cords | End count (cords/50 mm) | Cord Weight per one side (g) | Cord Weight per unit width (g/mm) | Road noise improving effect | Peak level of road noise (dB) |
| Conventional Tire | — | — | — | — | standard | 60.7 |
| Tire of Invention 6 | nylon 840 D/2 | 50 | 7 | 0.23 | sufficient | 59.7 |
| Tire of Invention 7 | nylon 840 D/2 | 70 | 10 | 0.33 | sufficient | 59.7 |
| Comparative Tire 2 | steel 2 + 2 (0.25) | 40 | 45 | 1.49 | slight | 60.4 |
| Tire of Invention 8 | steel 2 + 2 (0.25) | 35 | 39 | 1.30 | sufficient | 59.8 |
| Tire of Invention 9 | steel 2 + 2 (0.25) | 30 | 33 | 1.12 | sufficient | 59.3 |
| Comparative Tire | steel 2 + 2 (0.25) | 50 | 56 | 1.86 | nil | 60.7 |

TABLE 2-continued

| | Cord reinforcing layer | | | | | |
|---|---|---|---|---|---|---|
| | Kind of cords | End count (cords/50 mm) | Cord Weight per one side (g) | Cord Weight per unit width (g/mm) | Road noise improving effect | Peak level of road noise (dB) |
| Tire of Invention 10 | aramide 1000 D/2 | 50 | 14 | 0.46 | sufficient | 59.3 |
| Comparative Tire 4 | glass (ECK 15 3/0) | 50 | 43 | 1.42 | slight | 60.3 |
| Tire of Invention 11 | glass (ECK 15 3/0) | 50 | 26 | 0.86 | sufficient | 59.4 |

It can be understood from Table 2 that the Comparative Tires Nos. 2, 3 and 4 could reduce the peak level of the road noise to a level equal to, or slightly lower than, the peak level of the Conventional Tire because all of them used the cord reinforcing layers having the cord weight of greater than 1.30 g/mm unit width. Accordingly, the road noise improving effect of these tires was low. In contrast, the Present Tires Nos. 6 to 11 could drastically reduce the peak level of the road noise in comparison with the Conventional Tire, and it can be understood that all of these Tires provided a great road noise improving effect in the high frequency range.

EXAMPLE 3

The Tires Nos. 12 to 17 of the present invention were produced in the same way as in Example 2 except that the depth h and width Q of the recess of the buttress portion shown in FIG. 2 and its thickness h' from the bottom of the recess to the cord reinforcing layer were changed as tabulated in Table 3, respectively.

The peak level of the road noise of each of these Tires Nos. 12 to 17 of the present invention was measured under the same measurement condition as in Example 1, and the result was tabulated in Table 3.

TABLE 3

| | h (mm) | h' (mm) | Q (mm) | Road noise peak level |
|---|---|---|---|---|
| Tire of Invention 12 | 0 | 3.0 | 0 | 59.7 |
| Tire of Invention 13 | 1.5 (50%) | 1.5 | 20 (67%) | 59.3 |
| Tire of Invention 14 | 1.5 (50%) | 1.5 | 6 (20%) | 59.7 |
| Tire of Invention 15 | 1.5 (50%) | 1.5 | 10 (33%) | 59.4 |
| Tire of Invention 16 | 0.3 (10%) | 2.7 | 10 (33%) | 59.7 |
| Tire of Invention 17 | 0.5 (17%) | 2.5 | 10 (33%) | 59.4 |

In Table 3, the numerical value in the parenthesis ( ) of h represents the percentage of the thickness (h+h') of the rubber layer of the buttress portion away from the recess, and the numerical value in the parenthesis ( ) of Q represents the percentage of the width W of the cord reinforcing layer.

It can be understood from Table 3 that the road noise can be further reduced when the depth h of the recess is at least 15% of the thickness (h+h') of the rubber layer of the buttress portion or when the width Q (length) of the recess is at least 30% of the width of the cord reinforcing layer.

What is claimed is:

1. A pneumatic radial tire of the type wherein both end portions of a carcass layer are turned up around a pair of right and left bead cores, respectively, and at least two belt layers are disposed on the outer periphery of a tread of said carcass layer, characterized in that:

a cord reinforcing layer is disposed at a buttress portion between a maximum width portion of a radial section of said tire and the end portion of said belt layers in a tire width-wise direction, a cord weight of said cord reinforcing layer per unit width of said radial section is not greater than 1.30 g/mm, a cord angle with respect to a tire circumferential direction is not greater than 80°, a minimum rubber thickness of a rubber layer of said buttress portion over said cord reinforcing layer is at least 1 mm, and a recess having a depth of at least 15% of the thickness of said rubber layer of said buttress portion and a width of at least 30% of the width of said cord reinforcing layer is disposed on the surface of said buttress portion.

2. A pneumatic radial tire according to claim 1, wherein the cord weight of said cord reinforcing layer is within the range of 0.10 to 1.30 g/mm.

3. A pneumatic radial tire according to claim 1, wherein the cord angle of said cord reinforcing layer with respect to the tire circumferential direction is not greater than 60°.

4. A pneumatic radial tire according to claim 1, wherein the cord angle of said cord reinforcing layer with respect to the tire circumferential direction is substantially 0°.

5. A pneumatic radial tire according to claim 1, wherein reinforcing cords constituting said cord reinforcing layer are organic fiber cords selected from the group consisting of nylon, polyester and aramid.

* * * * *